May 19, 1953

P. T. CLARY 2,639,133

COFFEE ROASTER

Filed Aug. 26, 1949

INVENTOR.
Patrick T. Clary.
BY
ATTORNEY

Patented May 19, 1953

2,639,133

UNITED STATES PATENT OFFICE 2,639,133

COFFEE ROASTER

Patrick T. Clary, Carnegie, Pa.

Application August 26, 1949, Serial No. 112,422

1 Claim. (Cl. 263—33)

This invention relates to improvements in coffee roasters and method of operating same.

In my prior Patent No. 2,017,892, of October 22, 1935, I have disclosed a method of processing coffee by subjecting the coffee beans to the direct heat of a flame from a burner and then spraying water on the heated beans, while confining the resultant steam in contact with the beans to properly impregnate the latter.

I have now discovered that by circulating hot air through coffee, while it is roasting, and in a closed system, out of contact with gas flames and their products of combustion, the moisture and flavor of the coffee beans can be preserved due to the retention of evolved moisture and the maintenance of a maximum uniform heat in the roaster by recycling heated air therethrough, and without requiring addition of water to the system.

The improvements in processing coffee are made possible by the novel coffee roasting apparatus herein, whose construction and use insure the proper conjoint roasting and moisture tempering of coffee beans, without the addition of water and without exposing the roasting beans to the contaminating effects of combustion gases.

It is, therefore, among the features of novelty and advantage of the present invention, to provide an improved apparatus for roasting coffee beans, and the like, in a closed system and out of contact with gas flames and their contaminating products of combustion; to roast coffee beans in a directly heated, closed chamber, while recycling heated air, at predetermined temperatures, through the roasting chamber, and controlling the moisture content of the roasting beans, by the regulated admission of cold air to roasting chamber.

Figure 1:
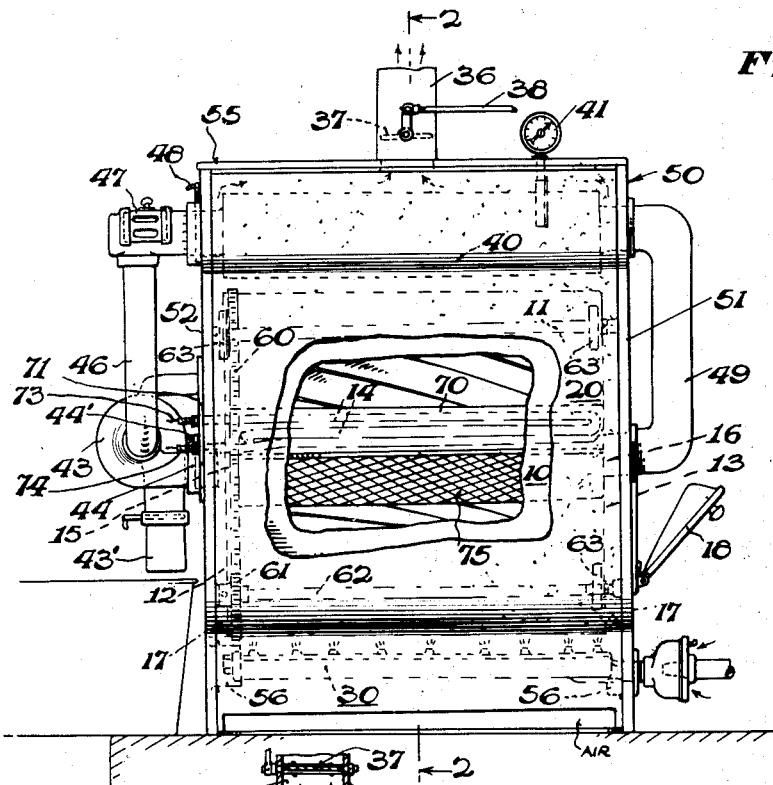
Figure 2:
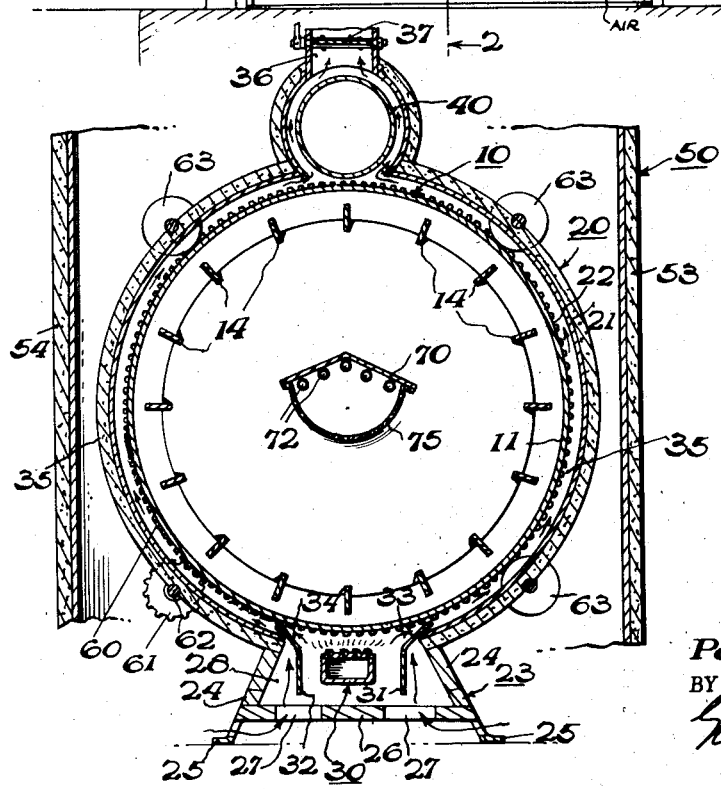

The above and other desirable features of novelty and advantage of the present invention will be more clearly understood by reference to the attached drawings illustrating a preferred embodiment of the invention, and in which;

Fig. 1 is an elevation, partly in broken section, of a novel coffee roaster, and Fig. 2 is a cross-section of the apparatus taken on line 2—2 of Fig. 1.

Referring more particularly to the drawings, the novel apparatus will be seen to comprise a rotatable roaster 10, mounted for rotation in a conformed insulated casing 20, in spaced relation therewith. A gas heater 30 discharges flame gases into the flue formed by and between the outer wall of the roasting chamber and its insulated casing. At the top of the drum 10, the casing 20 is conformed to receive and space a hot air heater 40. An insulated outer casing 50 houses the apparatus, as will be described more in detail hereinafter.

The drum 10 is mounted for rotation and is driven by a driving mechanism comprising a ring gear 60 in mesh with gear wheel 61, mounted on driving shaft 62, which is driven by a suitable motor, not shown. A plurality of guiding and spacing rollers 63 have bearing engagement with the drum 10, as shown.

Referring now to the details of the novel coffee roaster, the insulated outer housing 50 comprises front and back walls 51, 52, side walls 53, 54 and top 55. Brackets 56 mounted on walls 51, 52 above the floor level serve as supports for the ends of manifold 30 of the gas burner. The casing 20 comprises an inner shell 21, lagged with an outer insulating coating 22. The casing 20 is mounted on a pedestal 23 comprising elongated angularly disposed walls 24 having flanged feet 25. A base plate 26, provided with spaced air inlets 27, closes the chamber formed by the legs 24, and is desirably mounted on the feet or legs 25 as indicated. The plenum chamber 28, formed between the angular walls 24 and apertured base 26, is provided with spaced baffles 31, 32 mounted on opposite sides of the burner 30, and continuously therealong. The upper edges of the baffle plates or guides 31, 32 are bent outwardly at an angle to form deflectors 33, 34, respectively. These deflectors form slotted channels with and between the drum 10 and the inner wall 21 of the insulated casing 20. Referring more particularly to Fig. 2, it will be seen that the plenum chamber 28 comprises an inner combustion chamber defined by and between the baffles 31, 32 and a pair of outer cooling chambers defined by and between the baffles and the angular sides of the pedestal support. It will be noted that the baffles 31, 32 are generally arranged to split the incoming streams of air through openings 27 to form an inner combustion air supply stream and two outer cooling air streams. The combustion gases from burner 30, mixed with cooling air, will flow into the space or flue 35 between the drum and the insulating casing 20, the spacing 35 forming a split heating duct surrounding the drum 10. The combustion gases flow over the surface of the drum, ascend upwardly to flow over and around hot air heater 40, and thence upwardly through vent 36 to the atmosphere. The vent 36 is provided with a suitable damper 37, controlled by any suitable lever mechanism designated generally by numeral 38.

The roaster drum 10 will comprise an imperforate continuous solid outer wall 11 and closed ends 12, 13. A plurality of lifting vanes 14 are mounted on the inside of the drum. The end wall 12 of the drum is provided with a suitable circular aperture 15, and the opposite end 13 is provided with an aligned opening 16. A pair of angular flanges 17 are secured on the front of ends 12, 13 and extend approximately to the inside of walls 51, 52, sufficient clearance being left to permit free rotation of the drum 10. The flanges 17 effectively seal off the openings in the ends of the drum and preclude admission of combustion gases into or between the inner spaces of walls 51, 52 and the ends of the drum.

A special feature of the invention herein is the hot air recirculatory system. This system, as illustrated, comprises the cylindrical heater 40, fitted with heat indicator 41. A combination suction fan-blower 43 is connected at the base of the rear wall 52 of the casing and pipe 44 incorporating slide valve 44'. The blower discharge pipe 46 discharges into hot air heater 40 through a right angle bend incorporating a cold air inlet valve 47 and slide valve 48. The outlet end of the hot air heater discharges into the roaster chamber below the spreader through duct 49, as shown. The blower 43 is provided with a valved chaff discharge line 43' and discharges into any suitable chaff container, as shown.

A spreader 70 is disposed within the roaster chamber, being mounted at one end, on plate 71, secured to the end wall 52 of the casing. A plurality of electric resistance heating elements 72, having current leads 73, 74, are mounted on the plate 71 and subjacent the spreader 70. A screen 75 is secured underneath and along the spreader 70 to form a duct discharging into hot air return pipe 44. A pivoted filling and emptying gate, or front door 17 is mounted on the front wall 51 of the casing and extends into the drum space.

The operation of the novel system herein will now be readily apparent: In starting the first roast, the roasting cylinder 10 should be heated up to 500° F., or more. To this end, the resistance heating elements 72 are energized to speed up the heating of the roaster to the proper temperature. The spreader 70 is heated and serves to heat up the coffee beans falling in contact therewith. While the coffee beans are flowing into the cylinder the chaff slide valve 44' is opened, hot air valve 48 closed, and cold air valve 47 and blower 43 are opened. When all the green beans are in the cylinder, the chaff discharge valve, the blower, and the cold air valve are closed, the hot air valve 48 is opened, the motor drive turned on, and the heat is regulated as required; a check on the temperature being made by means of heat regulator 41. When the roasting operation is about finished, the heat is turned off, valved chaff line 43', blower 43, and cold air valve 47 are opened, hot air slide valve 48 is closed, and the coffee is milled for two or three minutes. As a result, the roasted beans are polished and the chaff discharged. The hot, roasted beans are then discharged to a cooling pan.

With the roaster drum in rotation, the hot gases from the burner will flow over the surfaces of the roaster and then over the surface of the hot air heater drum 40. Simultaneously with the external roasting, the beans in the roasting drum are subjected to a separate recirculating stream of tempered, heated air. Air is caused to flow through duct 49 into roasting chamber 10 through screen 75 and out through pipe 44 to suction blower 45 and hot air heater 40. The heated air is then recycled. It will be noted that the coffee is uniformly roasted by being heated directly from the walls of the cylinder 10 and by hot air passed in a closed cycle through the roasting chamber, thus maintaining the coffee beans out of contact with contaminating products of combustion from the heater. Furthermore, because of the heating action by direct heat, coupled with a uniform positive flow of heated air, the coffee beans are uniformly heated throughout the course of the roasting operation, and the heating drum is maintained as closely as is physically possible at a uniform temperature instead of being subjected to intense heat in one area and a relatively low heat in other areas.

By the improved system herein, a uniform heat is maintained during roasting, and all the moisture and goodness of the coffee in the bean is retained. The air circulation is so devised that when the air is turned off, in seconds the roasting chamber will be filled with steam. When the air is turned on again, in a few seconds the moisture is resorbed in the bean, preserving the strength and essence of the coffee.

As noted above, during the course of the roasting operation, the heating gases may be tempered by admission or incorporation of controlled amounts of cold air. Additionally, by closing slide 44 and opening cold air valve 49, at the end of the roasting operation, the atmosphere in the roasting chamber and the coffee beans are substantially chilled, with the resultant condensation of moisture, and its resorbtion by the hot beans. The cold air is admitted into the roaster in sufficient amount to check the roast and give the roaster time to judge the finish. Improved construction and mode of operation permits a rapid and efficient handling of the roasted coffee beans and their relatively fast discharge from the roaster to the cooling pans, permitting prompt reloading and return to the regular roasting operation cycle. As noted, the electric heaters 72 will be energized at the start of the roasting to speed up the bringing of the roaster up to roasting heat. This is a particularly advantageous feature, as the initial heating of the roasting drum is not effected too rapidly by the main gas heating flame.

By the controlled admission of cold air to the recirculating hot air, a tempered product can be obtained and the roasting operation, including cooling and discharge of the roasted beans, can be expeditiously effected without requiring cooling equipment. By the special mounting of the spreader 70 and subjoined electrical heating elements, as well as outlet duct 44 and chaff discharge duct 43 placed upon plate 71, these elements are removable as an entity. This novel unitary combination of elements can be installed as a unit in present types of roasters where combined with the suction blower 43 and with or without special hot air heater 40. The operation of the present types of roasters can be very much improved as to speed of operation and through less material handling.

It will now be understood there has been provided a novel apparatus for roasting coffee by conjoint use of external gas firing and internal hot air circulation whereby the roasted coffee is uniformly roasted and cooled by the controlled circulation of tempered hot air and the roasting of the coffee is carried out with a minimum of equipment and in appreciably reduced time.

I claim:

A roaster for coffee beans and similar bean-like materials comprising an outer insulated housing, a rotary drum mounted for rotation in the housing, an insulated casing about the drum, a burner manifold mounted at the bottom of the drum and longitudinally thereof, means for introducing combustion air to said burner and directing the products of combustion through the space between the rotary drum and the insulated casing, a second fixed drum mounted above the rotary drum, a second insulating casing surrounding and spaced from the fixed drum and continuous with the first insulated casing, means comprising a hot air pipe connecting the said rotary drum and the stationary drum, and means for discharging heated air from the said stationary drum to the rotary drum and circulating same comprising a valved discharge line, cold air valving means in said discharge line, a blower connecting said discharge line and the rotary drum, whereby the rotary drum and the stationary hot air heater are directly heated by the products of combustion of the burner, and the coffee in the rotary drum is continuously heated by a separate recycled stream of hot air.

PATRICK T. CLARY.

References Cited in the file of this patent

UNITED STATES PATENTS

| Number | Name | Date |
|---|---|---|
| 849,581 | Spencer | Apr. 9, 1907 |
| 1,133,047 | Limburg et al. | Mar. 13, 1915 |
| 1,319,764 | Fullard | Oct. 28, 1919 |
| 1,453,312 | Engel | May 1, 1923 |
| 1,782,946 | Talbutt et al. | Nov. 25, 1930 |
| 1,911,763 | Meade | May 30, 1933 |
| 1,991,190 | Backer et al. | Feb. 12, 1935 |
| 2,033,169 | Zeun | Mar. 10, 1936 |
| 2,069,192 | Behr et al. | Jan. 26, 1937 |
| 2,087,602 | McCrosson | July 20, 1937 |
| 2,129,673 | Burns | Sept. 13, 1938 |
| 2,443,620 | Hubbard | June 22, 1948 |